Dec. 1, 1953   A. BADMAIEFF   2,661,164
AUTOMATIC FILM SELECTING METHOD AND SYSTEM
Filed Aug. 15, 1949
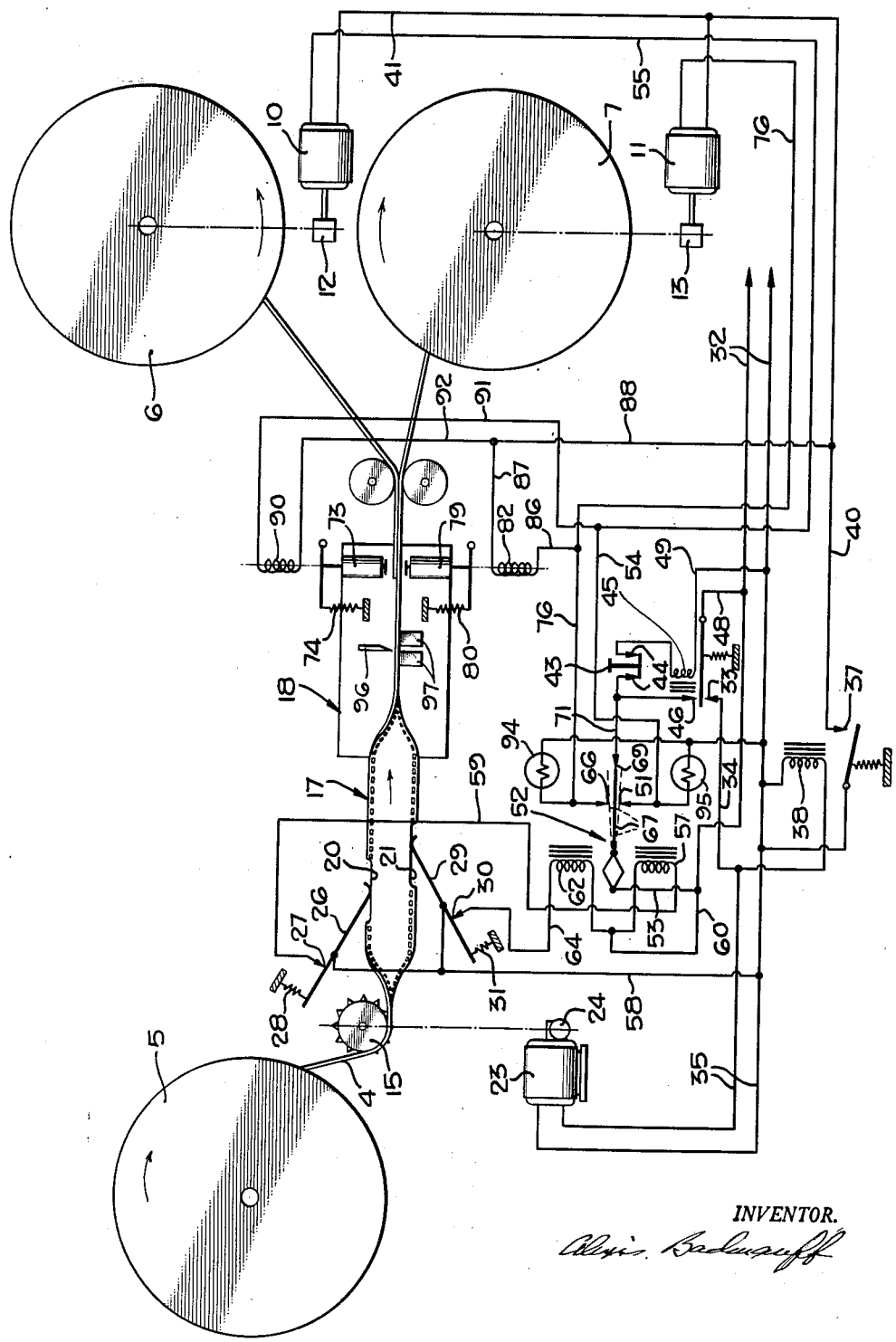
INVENTOR.
Alexis Badmaieff Patented Dec. 1, 1953

2,661,164

UNITED STATES PATENT OFFICE 2,661,164

AUTOMATIC FILM SELECTING METHOD AND SYSTEM

Alexis Badmaieff, Los Angeles, Calif.

Application August 15, 1949, Serial No. 110,292

12 Claims. (Cl. 242—55)

This invention relates to the production of motion pictures, and particularly to the editing of motion picture film in accordance with prearranged synchronization and similar marks.

It is well-known that, during the production of motion pictures, various sequences called "takes" or "shots" are made of a certain scene, some of which may be determined as unsatisfactory at the time of photographing, and so marked, at that time, while others may be processed and printed, after which a selection of the best take is made. Since the sequences are photographed in serial order on a roll of film, it is desirable that the unsatisfactory sequences be eliminated so that only the sequences to be processed are sent to the laboratory. The present invention permits a very rapid selection and segregation in a darkroom, of the unsatisfactory sequences in the film roll, so that the film may be rapidly prepared for the laboratory. Furthermore, other related sequences for different stories may be rapidly segregated during the unwinding of the roll.

To accomplish the rapid selection of the sequences, the film is provided with synchronization notches on one edge of the picture film to indicate the ends of the different sequences, which notches correspond with a synchronization mark on the sound film. When a sequence has been photographed and that sequence is determined to be unsatisfactory, the director or other operator may close a switch, which will punch a notch or a similar indication on the other edge of the film opposite or slightly behind the synchronization mark which indicates the end of the sequence. This marking system is disclosed and claimed in my U. S. Patent No. 2,633,055 of March 31, 1953.

After a roll of film is completed, the operator in the darkroom will unroll the film from the tail end. The film passes through switch mechanisms in contact with either edge of the film. As long as the switch mechanism on only the synchronization mark edge of the film is operated, the film will continue to pass onto the takeup reel. However, when a notch appears on both sides, the film will be immediately stopped and is clamped in that position. The film may then be cut at this point, and the unsatisfactory take wound onto a second reel, until the notch indicating the separation between sequences arrives at its switch mechanism. In order for this particular synchronization mark notch to stop the film, a toggle switch is readied by the prior operation of the opposite notch switch mechanism, which permits the synchronization mark switch mechanism to stop the film when this point is reached. The film is then cut and the end spliced to the end of the satisfactory sequences. The film is then started through the apparatus again. However, if a double notch appears at the next point, the next unsatisfactory take can be rolled onto a reel holding such takes. Thus, a very rapid selection of undesired takes may be made. By the provision of triple notches, certain sequences to be wound on certain rolls can be similarly selected.

The principal object of the invention, therefore, is to facilitate the production of motion pictures.

Another object of the invention is to provide an improved method of and system for selecting and segregating certain film sequences from a roll of film.

A further object of the invention is to provide an improved selecting device for rapidly stopping a film drive mechanism at the beginning and end of certain sequences from a roll of film containing a series of sequences to be segregated.

Although the novel features which are believed to be characteristic of this invention will be pointed out with particularity in the appended claims, the manner of its organization and the mode of its operation will be better understood by referring to the following description, read in conjunction with the accompanying drawings, in which the single figure is a combination schematic and diagrammatic view of the invention.

Referring now to the drawing, film 4 on a reel 5 includes a series of photographed sequences to be selected and segregated and wound on reels 6 and 7, reel 6 being for the sequences to be processed, and reel 7 receiving the unsatisfactory sequences. The reels 6 and 7 are driven by respective motors 10 and 11, which are connected to reels 6 and 7 through slipping clutches 12 and 13 in the usual manner to accommodate the increasing diameters of the reels of film as wound up. A sprocket 15 unwinds the film 4, which is shown at 17 as being rotated ninety degrees between sprocket 15 and a splicer 18 for better explanation, the reels 6 and 7 taking up the film as it is released by sprocket 15.

As mentioned above, the film has a plurality of synchronization notches on one side of the film, which coincide with synchronization marks on a sound film. These notches are placed at the ends of the sequences during photographing, and appear ahead of the take as the film is unwound. The notch shown at 21 is slightly ahead of notch 20, as the film is unwound, since it is made after notch 20 when the film is wound on reel 5. However, the arm 26, which closes contact 27 under action of bias spring 28 when notch 20 appears, is so spaced that it will always operate ahead of arm 29, which closes contact 30 under action of bias spring 31. Thus, arm 26, contact 27, and bias spring 28 form one switch means and arm 29, contact 30, and bias spring 31 form another switch means. A drive motor 23 with reduction gears 24 drives sprocket 15, as shown by the connecting broken line, and is provided with a brake (not shown) to stop the motor and sprocket quickly, after the motor is de-energized. The motors 10, 11, and 23 are energized from any suitable power source over conductors 32, contact 33 when closed, conductors 34 and 35, contact 37 when closed by the energization of relay winding 38, and conductors 40, 41, 55, 54, and 76, motors 10 and 11 being alternately energized as will be explained later.

To start motor 23 and either motor 10 or 11, switch 43 is pressed, which breaks contacts 44 and de-energizes winding 45, previously energized over contacts 44 and 46, and conductors 48 and 49, which makes contact 33 completing the energizing circuit to motor 23. Assuming contact 51 of toggle switch 52 is closed, motor 10 is energized over one of conductors 32, conductor 53, armature 67, contact 51, conductors 54, and 55, conductor 41, conductor 40, closed contact 37, since winding 38 has been energized with closing of contact 33, and the other conductor 32. Thus, the film from reel 5 is wound on reel 6. As each notch 20 closes contact 27, the motors will continue to run, since the closing of contact 27 energizes winding 57 over conductors 58, 59, and 60, which maintains contact 51 closed.

However, should a notch 21 appear, winding 62 of toggle switch 52 is energized over conductor 58, closed contact 30, and conductors 64 and 60, which closes contact 66 and breaks contact 51. As the armature 67 of toggle switch 52 moves between contacts 51 and 66, it momentarily closes a contact 69, which energizes winding 45 over conductor 53, armature 67, conductor 71, contacts 44, and conductor 49. The energization of winding 45 closes contact 46 and opens contact 33 and holds contact 46 closed and contact 33 open. The breaking of contact 33 de-energizes motor 23 and relay winding 38, the latter breaking contact 37 and de-energizing motor 10. Thus, the advancement of the film is stopped. At this point, the film is cut and the end from reel 6 placed under film clamp 73, which is held by a spring 74. The other end is wound on reel 7 or spliced to film already on this reel. The mechanism is now ready for further unreeling of the film from reel 5.

To again start the mechanism, switch 43 is pressed, which energizes motor 23 and relay winding 38, as described above, and thus, motor 11 over conductor 53, armature 67, and conductors 76 and 40. Thus, the unsatisfactory take is wound on reel 7, reel 6 remaining stationary. In the event a previous film end is held by clamp 79 having a holding spring 80, the clamp is released by energization of solenoid winding 82 over conductors 76, 86, 87, and 88. Although it was shown above that the closing of contact 27 by a synchronization mark notch 20 will not normally stop the film; however, once a notch 21 appears, the next synchronization notch will stop the film. This is accomplished by the energization of winding 57 of toggle switch 52, which moves armature 67 to open contact 66 and close contact 51, the movement thereof momentarily closing contact 69, which energizes winding 45 and breaks the motor energizing contacts 33 and 37. If only a single notch appears, the film is cut again, the end held by clamp 79, and the other end spliced to the satisfactory takes end held by clamp 73.

The film may then be further unwound by actuating switch 43, as described above, the clamp 73 releasing the film by energization of solenoid winding 90 over conductors 55, 91, 92, and 88. Thus, the operator working in a darkroom may very rapidly select and segregate the takes marked as unsatisfactory at the time of photographing from the good ones, which are to be processed, the final good takes also being properly synchronized with the pre-recorded sound track.

By the use of a red lamp 94 and a green lamp 95, the position of toggle switch 52 and the operating takeup reel may be indicated. A cutting knife 96 is shown above die blocks 97.

I claim:

1. A system for rapidly selecting and segregating satisfactory and unsatisfactory sequences from a roll of film, comprising means for marking said film with markings of different characters in accordance with the sequences to be joined together, means for continuously advancing said film during the occurrence of markings on said film of the same first character, means for automatically stopping said film during the occurrence of markings of a second character, and means for automatically stopping said film during the subsequent occurrence of said markings of said first character after markings of said second character have stopped said film.

2. A control system for a film drive mechanism comprising a power supply, a film take-up reel, a film supply reel, means for advancing film from said supply reel to said take-up reel, means for driving said take-up reel, a pair of switch means positioned along the path of said film and adapted to be actuated by markings on said film, relay means connected to said switch means and to said film advancing means, said relay means adapted to be actuated by both of said switch means for controlling the de-energization of said film advancing means and said take-up reel driving means from said power supply, and manual means for initially connecting said power supply to said film advancing means for energizing said film advancing means and said driving means for said take-up reel.

3. A control system in accordance with claim 2, in which said relay means has a pair of windings, one winding being connected to said power supply when one of said pair of switch means is actuated by said film and the other winding being connected to said power supply when the other of said pair of switch means is actuated by said film, and means are provided for connecting said manual means to said power supply through said relay means upon actuation of said relay means, the alternate actuation of said pair of switches actuating said relay means and disconnecting said power supply from said film advancing means and said take-up reel driving means.

4. A control system in accordance with claim 2, in which a second take-up reel and means for driving said second take-up reel are provided, connections being provided between said power supply and said second take-up reel driving means, actuation of said relay means breaking said connections between said power supply and said take-up reel driving means energized at the time of actuation of said relay means.

5. The method of selecting and segregating sections of a certain type from a film roll having various types of sections thereon, comprising marking said sections to be segregated together in the same manner, separately segregating all of said sections of one type by splicing said sections together in the reverse order of their production when said sections are separated by a section of a different type, continuing the segregation until a different type of section is encountered, segregating said different type of section, and then resplicing the tail end of the next section of said first mentioned type to be segregated to the head end of the last prior segregated section of said first mentioned type.

6. The method of claim 5, in which the selection of the same type of sections to be segregated is controlled by different markings of said sections.

7. A system for selecting and segregating sections of a certain type in a film roll having sections of other types, comprising drive means for advancing film from said roll, said film being differently marked between the sections thereof, the same type of mark determining the same type of section, a power supply for said drive means, switch means in the path of said film, one mark actuating certain of said switch means, and another mark actuating another of said switch means, a relay connectable between said switch means and said power supply by actuation of said switch means, said relay being energized in one direction by the actuation of one switch means, and energized in the opposite direction by the actuation of said other switch means, and means for disconnecting said power supply from said drive means when said relay is energized.

8. A system in accordance with claim 7, in which a taken-up reel is provided for one type of section of said film roll, together with drive means for said reel and connections between said relay and said take-up reel drive means, energization of said relay breaking said connections when a different type of section arrives at said switch means.

9. A system in accordance with claim 7, in which said relay means includes a toggle switch having two windings, an armature, and triple contacts for said armature, energization of one of said windings by one certain switch means actuated by one mark moving said armature from one of said contacts to a second of said triple contacts past a third contact, the connection of said armature with said third contact disconnecting said power supply from said drive means.

10. A selective relay circuit for controlling the advancement of film in accordance with the marking thereof, comprising film advancing means, energizing means therefor, a pair of switches along the path of said film and operated by markings on said film, certain markings operating one of said switches and other markings operating another of said switches, a relay having two windings, a circuit from one of said pair of switches to one of said windings to said energizing means, a second circuit from the other of said pair of switches to the other of said windings to said energizing means, a manual switch for initially energizing said film advancing means, and a circuit through said manual switch and through said relay to said energizing means, actuation of one of said pair of switches connecting one of said windings to said energizing means through said manual switch to disconnect said energizing means from said film advancing means, actuation of the other of said pair of switches connecting said other winding to said energizing means through said manual switch to disconnect said energizing means from said film advancing means.

11. A system for rapidly selecting and segregating satisfactory and unsatisfactory sections from a roll of film containing a series of said sections in serial order, comprising means for marking the film at the tail end of each satisfactory section with a certain type of mark at the time of completing said section, means for marking the film at the tail end of each unsatisfactory section with another type of mark at the time of completing said sections, means for advancing said film from said roll in the reverse order of making said sections, means for continuing the advancement of said film while markings of one certain type are encountered, and means for stopping said film whenever a marking of a different type is encountered.

12. A system for rapidly selecting and segregating satisfactory and unsatisfactory sound sections from a roll of sound film, comprising means for marking the film at the tail end of each satisfactory sound section with a mark of one type at the completion of the recording of said section, means for marking the film at the tail end of each unsatisfactory sound section with a mark of another type at the completion of the recording of said section, means for advancing said film from said roll in the reverse order of the recording of said sections, and means for joining all satisfactory sections characterized by one type of mark and all unsatisfactory sections characterized by a different type of mark, said film being continuously advanced during the occurrence of markings of the same type.

ALEXIS BADMAIEFF.

References Cited in the file of this patent
UNITED STATES PATENTS

| Number | Name | Date |
|---|---|---|
| 1,859,435 | Deforest | May 24, 1932 |
| 1,879,866 | Aschenbrenner | Sept. 27, 1932 |
| 2,016,506 | Maluss et al. | Oct. 8, 1935 |
| 2,360,255 | Mihalyi | Oct. 10, 1944 |